March 12, 1957  L. R. TRAVIS  2,784,595
CORD DRIVE
Filed June 15, 1953

INVENTOR
LAWRENCE R. TRAVIS
BY
Michael Hertz
ATTORNEY

United States Patent Office 2,784,595
Patented Mar. 12, 1957

2,784,595

CORD DRIVE

Lawrence R. Travis, Snyder, N. Y., assignor to Sylvania Electric Products Inc., a corporation of Massachusetts Application June 15, 1953, Serial No. 361,553

7 Claims. (Cl. 74—10.7)

This invention relates to cord drives. In particular it relates to such drives in radio or television tuning devices utilizing, in combination, cord loops and spring devices.

In these tuning devices, a cord loop generally has ends terminating either in a single coiled spring hooked to a face of a disc type pulley or to a pair of coil springs, each so hooked to the pulley. In such arrangements it is usually difficult to apply the cord and spring to the pulley without the use of special tools or without having developed a special technique, particularly when not in the factory and in the hands of a technician who is not especially trained in applying the particular drive to the electronic device.

It is an object of this invention to provide a drive arrangement which will enable the application of the cord and spring member to the associated parts without the use of any tools by simple hand manipulation.

It is a further object of this invention to improve the operating characteristics of a tuner drive by providing a drive in which a single spring is employed and in which the spring may be bodily oscillated to provide for a greater compensation in adjustment of the cord both in position and tension than in prior arrangements.

These and other objects will be apparent after reading the following specification taken in conjunction with the accompanying drawings in which.

Figure 1:
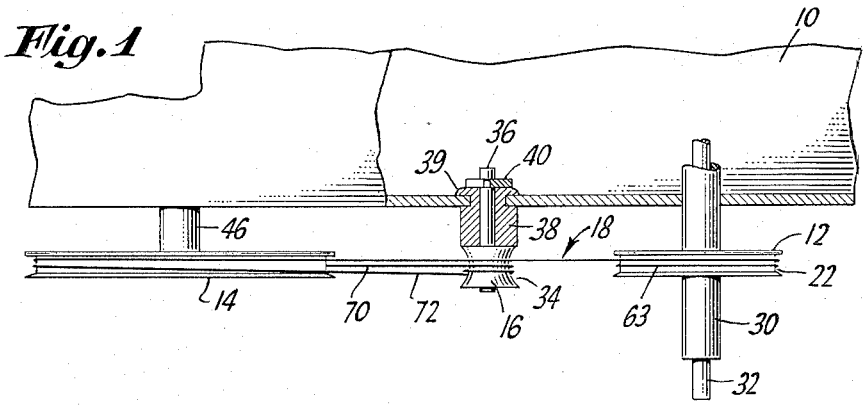
Fig. 1 is a view, partly diagrammatic, showing a portion of a chassis and showing how my spring and cord are applied to a pair of pulley discs and an idler pulley mounted on the chassis.
Figure 2:
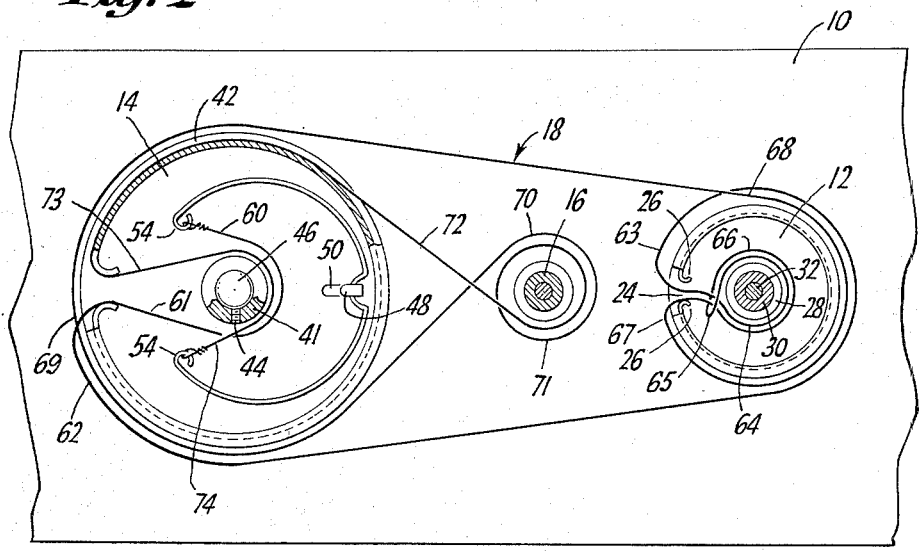
Fig. 2 is an elevational view of the same, parts being shown in section.
Figure 3:
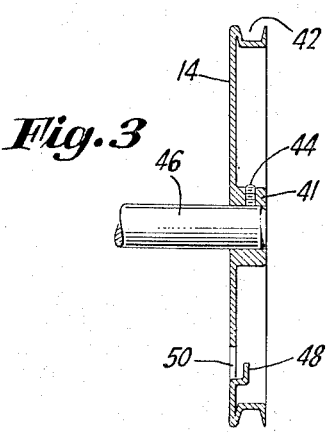
Fig. 3 is a view of a pulley forming part of my novel combination, the pulley being shown in section and mounted on a shaft.

For the purpose of exemplification only, I have shown my novel cord, spring and modified pulley combination in a type of television set having both a very high frequency and an ultra high frequency tuner. For convenience of understanding, the cord is shown broken in parts to indicate that those parts underlie other elements.

In the drawings, 10 is a portion of a chassis having mounted therein two disc type pulleys 12 and 14 and a rotatable idler pulley 16. Trained about these pulleys is a cord 18, the ends of which are attached to a bow spring 20.

The pulley 12 is a conventional disc type pulley having a grooved peripheral flange 22, the periphery extending substantially around the entire circumference of the pulley, there being, however, a small gap at 24, this gap being defined by inwardly turned lips 26 of the flange 22. The pulley also has a hub 28 positioned on a rotatable sleeve 30 by means of a set screw or the like, not shown, this sleeve functioning in addition to rotating the pulley 12 to operate other parts such as a vernier condenser of the V. H. F. tuning unit. The main control of the tuning unit is effected by rotation of the shaft 32, rotatable within the sleeve 30. As is well known in the art, the forward ends of the sleeve and shaft as viewed in Fig. 1 are adapted to receive manually controlled knobs to effect independent rotation of the shaft and sleeve.

The idler pulley 16 has a concave portion 34 about which the dial cord is trained and reduced stub shaft portion 36 rotatable within a sleeve 38, the sleeve being secured to the chassis in any suitable manner as by reducing a portion of the sleeve in diameter, passing the same through the chassis and peening over the reduced end of the sleeve against the inner wall of the chassis as shown at 39.

The idler pulley is restrained against removal from its sleeve by a circular groove cut in the end of the shaft and a C-shaped spring clip 40 in the groove, as is conventional practice.

The pulley 14 is similar to the pulley 12 in that it has a hub 41 and a peripheral groove 42 as well as a gap 43, corresponding to the gap 24. The hub is provided with one or more set screws 44 to enable the pulley to be adjustably secured relative to the U. H. F. tuning shaft 46. The disc pulley 14 is additionally provided with a lug 48 struck out from the face of the pulley thus leaving an opening 50, said lug being bent away from the face parallel to the hub and then laterally radially toward the hub to provide a saddle for the spring 20.

The spring 20 is bowed and is provided with a central inturned portion 52 adapted to seat in the saddle; it is further provided with two eyes 54. The ends of the cord 18 are tied to these eyes.

The cord is looped about the pulleys and idler in the manner shown. The direction of the cord may be determined by following the reference characters 60 to 74.

The cord and spring may be applied to the pulleys and idler as follows: First the ends of the cord are tied to the bowed spring member. Then a slip loop is formed about one third the way down from one tied end of the cord and the slip loop is passed over the hub 28. The cord is then positioned about the periphery of pulley 12 in the manner shown. One run of the loop is then brought around the pulley 14 and passed into the gap 43 with the loops of the cord untwisted and the spring 20 brought well to the right of the hub 14. The other run of the loop is looped around the pulley 14, twice about the idler shaft 16 and then upwardly around the pulley 14, and through the gap 43. Now the strand portions 60, 61 and 73, 74 are not in crossed relationship to one another and the spring 20 is to the right of the hub portion 41. Next by rotating the spring 20 through an angle of 180° the strands 60, 61 and 73, 74 will be given a half twist to the right of hub 41. By bodily moving the spring 20 to the left, the strand portions 60, 74 will be partially wrapped around the hub and the reentrant portion 52 may be snapped into the saddle 48.

The spring bow may move through a considerable angle on its saddle 48 to accommodate the cord to inaccurate selection of lengths, and furthermore the pulley 14 may be rotated relative to the shaft 46 by loosening the set screw means 44 for further adjustment of the lengths of run of cord. The two arms of the bowed spring act as cantilevers and each contributes by springing together toward the maintenance of the proper tension of the cord, assisted by rotation of the whole bowed spring on its mount 48.

While I have illustrated my bowed spring member in conjunction with a cord particularly configurated about the various pulleys, it is of course obvious that other cord configurations may be adopted and slightly different bowed spring members may be employed without departing from the spirit of the invention as defined in the appended claims.

Having thus described my invention, what I claim is:

1. A cord drive for use with the tuning unit of a radio apparatus comprising a bowed spring and a cord having its ends attached to the ends of the spring, said spring comprising a single leaf an edge of which lies in one plane.

2. A cord drive component for use with the tuning unit of a radio apparatus consisting of a bowed spring having a reentrant portion substantially midway of the spring and cord receiving formations on the ends of the bowed spring, said spring comprising a single leaf an edge of which lies in one plane.

3. A cord drive for use with the tuning unit of a radio apparatus comprising a bowed spring having a reentrant portion substantially midway of the spring and cord receiving formations on the ends of the spring, in combination with a cord having its ends secured to the formations, said spring comprising a single leaf an edge of which lies in one plane.

4. A cord drive for use with the tuning unit of a radio apparatus comprising a bowed spring an edge of which lies in a single plane, said spring having a reentrant portion substantially midway of its length, a cord loop having its ends secured to the ends of the spring and a disc pulley having a circular face and peripheral grooved rim, said face having a mount close to the rim and projecting from the face, and said mount receiving the reentrant portion of the spring.

5. A cord drive comprising a bowed spring having a reentrant portion substantially midway of its length, a cord loop having its ends secured to the ends of the spring, and a disc pulley, said pulley having a hub, a disc face perpendicular to the hub and a peripheral grooved rim, said face having a mount projecting therefrom receiving the reentrant portion of the spring, said cord being engaged with means to drive the runs of the cord, and means engaging the cord to assist in maintaining tension therein comprising in part the hub of the pulley, the two ends of the cord adjacent the spring ends being looped about the hub and over a portion of the grooved rim of the pulley.

6. A cord drive comprising a bowed spring with a substantially central reentrant portion to form a pivot for the spring, cord receiving eyes at the ends of the spring, a cord having its ends secured to the eyes of the spring, and a pulley having a hub, a disc face and a peripheral groove, said disc face having struck out therefrom near the periphery thereof a tongue bent first parallel to the hub and then toward the hub to form a seat for the spring, a second driving pulley and an idler pulley, the cord being trained about both pulleys and the idler pulley to cause rotation of the driving pulley in either direction to effect rotation of the first pulley.

7. A cord drive comprising a bowed spring with a substantially central reentrant portion to from a pivot for the spring, cord receiving eyes at the ends of the spring, a cord having its ends secured to the eyes of the spring, and a pulley having a hub, a disc face and a peripheral groove, said disc face having struck out therefrom near the periphery thereof a tongue bent first parallel to the hub and then toward the hub to form a seat for the spring, a second driving pulley and an idler pulley, the cord being trained about both pulleys and the idler pulley to cause rotation of the driving pulley in either direction to effect rotation of the first pulley, the cord furthermore passing from an end of the bowed spring around the hub of said first pulley and then partially around the periphery thereof.

References Cited in the file of this patent

UNITED STATES PATENTS

| | | |
|---|---|---|
| 2,260,985 | Benton et al. | Oct. 28, 1941 |
| 2,645,943 | Mendelson | July 21, 1953 |